Patented Jan. 2, 1940

2,185,477

UNITED STATES PATENT OFFICE 2,185,477

RESINOUS LAMINATED PRODUCT AND METHOD OF MANUFACTURE

Wesley R. Thompson and William E. Flood, Metuchen, N. J., assignors to Catalin Corporation of America, a corporation of Delaware No Drawing. Application July 23, 1938, Serial No. 221,026

4 Claims. (Cl. 154—2)

The present invention relates to laminated sheet materials and more particularly to a process for producing a laminated, flexible, machineable material from resin-impregnated, fibrous sheets. This application is a continuation in part of our application Serial No. 92,508, filed July 25, 1936.

In United States Reissue Patent No. 19,710 there is described a process of producing phenol-formaldehyde condensation products which involves the steps of forming a true colloidal solution of the condensed phenol-formaldehyde molecule while in a hydrophilic state so that it forms a homogeneous phase with an appreciable percentage of water, after which a true gel structure is formed. In carrying out the process, a relatively large molecular proportion of formaldehyde relative to the phenol is employed, i. e., a mol ratio of at least 1.5 mols of formaldehyde to each mol of phenol, and preferably in the ratio of 2 to 3 mols of formaldehyde to each mol of phenol; and the initial reaction, at least as to its final phases, is completed on the alkaline side. Subsequently, the mass is treated with acid to carry it over to the weakly acid condition, and the mass is dehydrated until it is sufficiently thick so that a gel will form on heating.

This gel will have water colloidally dispersed throughout its mass. The presence of the water in this colloidally dispersed condition has a direct effect on the physical characteristics of the final resin and the fibrous material to which it is applied, rendering it tough and flexible and readily machineable, instead of being brittle and readily shattered with shock as is true of the prior art, resin-impregnated sheet materials. In the present invention the fibrous material, which is impregnated with this colloidal, hydrophilic resin is preferably subjected to a heat treatment which will cause the resin to gel in situ on the fibrous material with water colloidally dispersed throughout the gel, after which the entire mass may be pressed into desired shape and cured with heat so that the resin has the structure of a hardened gel with capillary cells containing minute droplets of water entrapped within the cells. The water content of the colloidal solution of resin prior to its application to the fibrous material should be reduced to the point where the resin will gel on heating. This requirement covers a relatively wide range of conditions and the exact nature of the gel to be produced may be controlled by the amount of dehydration. In preparation of the resin for use in the present invention the resin is heated until it at least approximately gels. If no foreign material has been added up to this time, this condition can be determined by the fact that the resin is exceedingly viscous at room temperature.

The word "gel" as used in the specification and claims herein is used in the same significance as it is used in the above Reissue Patent No. 19,710. The essential features relating to the formation of this gel is that there must be present a true colloidal solution or sol (usually in the form of a relatively viscous solution obtained by dehydrating an initial solution, and then this colloidal solution or sol must be so changed, by heating or otherwise, that the solids which were dispersed throughout the liquid to form a colloidal solution are now united to form a continuous structure embracing the liquid. When the colloidal resinous material used in this invention is treated to form a gel it forms a continuous structure with minute particles of water held in the gel structure. To produce this true gel it is essential that the resinous body employed shall remain hydrophilic up to the point where the gel is formed since if the resin undergoes a change from the hydrophilic to the hydrophobic condition prior to the formation of the continuous structure or gel, the action will be one of precipitation and the water will collect in comparatively large aggregates and will not be held dispersed throughout the mass in minute droplets as it is in the true gel used in this invention. Furthermore, if the resin is substantially completely dehydrated it will not contain the necessary dispersed droplets of water and accordingly a resin product will result which is brittle, non-resilient and non-flexible. The gel used in our invention is one formed from a hydrophilic colloidal resin and not from a hydrophobic or completely dehydrated resin.

In accordance with our invention we have discovered that if sheets of fibrous material, such as paper, are impregnated with the above described type of colloidal, hydrophilic resin and the resin is caused to gel in situ on these sheets and then the sheets superimposed and pressed sufficiently to cure the resin and bond the several sheets together, the resulting laminated product will have desired properties not obtainable by use of the conventional resins and processes. The impregnation of the sheets with the resin may be accomplished at any time while the resin is in the liquid condition, though it is preferable that it should be done after the resin is taken over to the weakly acid condition and after at least sufficient dehydration has gone on so that if the acidification has caused any precipitation, this will be cleared up. In other words, it is best to use the clear, slightly acidified, colloidal solution for impregnation. Subsequently the impregnated sheets are subjected to the above mentioned heat and pressure treatment and it is advisable, though it may not be necessary under special conditions, that the heating be conducted to the point where the resin is at least so viscous that approximately it is entering the gel stage, before any substantial pressure is applied.

Depending upon the article desired, the fibrous sheets may be made of wood, cloth, paper or similar fibrous bodies, and the liquid resin may be thinned with a volatile organic solvent such as alcohol or acetone, or mixture of alcohol and benzol, to assist in the impregnation. One product of our invention that has proven particularly valuable commercially contains sheets of resin-impregnated paper laminated together to produce a light colored, translucent, flexible, non-brittle sheet material, which may be used satisfactorily for the manufacture of radio dials and the like. This material is easily stamped and punched without fracturing and is stable against changes in dimensions with varying moisture conditions, which renders it particularly suitable for precision devices.

In any of the above mentioned resin-impregnated products, the resin may be dehydrated and the volatile solvent, if any has been employed, may be removed after the combination of the resin and the solid body, and this dehydration is followed or accompanied by a heating sufficient to bring the resin to the approximate gel condition. It is of the utmost importance however, and is vital to the success of the operation that any such heating or dehydration shall be stopped short of the point where the formation of a gel is impossible due to an insufficiency of water present. If the dehydration is carried beyond this point, the final product, instead of having the desired qualities of flexibility and ready machineability, will be hard and brittle and the particular benefits of this process will be lost.

For laminating sheet material, the best range of the water content based on the weight of resin, exclusive of any fibrous material, is between about 3.5% and 7.5%. These values are for the water alone and if a thinning solvent is employed the total volatile content may be somewhat increased, as ordinarily the solvent will not be entirely driven out. Usually for commercial operations it will be preferable to determine the total "volatile" that must be present under a given set of conditions to insure the correct amount of water and a check on this "volatile" can be used for plant control.

In accordance with one illustrative but non-limiting example of our invention, the resin and laminated paper product impregnated therewith were prepared as follows:

A colloidal solution of resin was prepared by reacting 200 parts of commercial formaldehyde (37%) with 100 parts of phenol using 3 parts of caustic soda as a condensing agent. The reaction was conducted in a jacketed kettle for about 2½ hours at a temperature of about 70° C. Vacuum was then applied which lowered the temperature and stopped the reaction. After about 10 hours dehydration with vacuum 8.17 to 8.75 parts of lactic acid were added reducing the pH of the mass to about 4.3. The dehydration was continued using vacuum and a jacket temperature of about 90° C., until a viscous solution was formed and a sample of the clear sol showed a water content of about 8% to 11%. This viscous resin solution was thinned with an equal weight of denatured alcohol and sheets of paper were impregnated with the alcoholic resin solution such that the impregnated mass was about 60% resin. These sheets were dried at a temperature of 130° C. for about 3 to 7 minutes to the point where they showed 4% volatile matter at 145° C. for 5 minutes. This was equivalent to a water content of about 4% based on the resin alone. This preliminary drying operation causes the resin to gel or at least begin to form a gel on the paper sheets. After this drying treatment four of these sheets were superimposed and pressed for 30 minutes at a temperature of 130° C. at a pressure of 1000 pounds per square inch. The resulting laminated sheet was very light colored and very flexible. It was also noted that the sheets after drying and before pressing were hygroscopic (due to the hydrophilic character of the resin) so that they had to be preserved carefully to maintain just the desired moisture content.

In the foregoing example no mention is made of the use of any plasticizers, for we have found that these materials are not essential to give the necessary flexibility and resilience and frequently their use tends to lower the water resistance. However, the use of plasticizers is not precluded, and in some instances a somewhat increased flexibility or softness, which may be of importance for punching stock, can be obtained by the use of some of the well-known plasticizers, which can be incorporated, for example, to the extent of between 5% and 15% based on the weight of the resin.

What we claim is:

1. A process of producing flexible laminated sheet material, which is sufficiently non-brittle to be stamped and punched without fracturing and is stable against changes in dimension with varying moisture conditions, comprising impregnating a fibrous sheet with an alcoholic solution of a hardenable phenol formaldehyde resin sol produced by reacting 1 mol of phenol with 1.5 to 3 mols of formaldehyde in the presence of an alkaline catalyst followed by neutralization of the excess alkali and dehydration of the reaction product to produce a hydrophilic sol containing an appreciable amount of water and adding alcohol; heating the impregnated sheets sufficiently to effect substantial removal of the alcohol in said sol, but leaving a substantial amount of water therein and heating sufficiently to convert said hydrophilic sol into a gel in situ on said sheets, said gel having the residual water colloidally dispersed throughout its mass, pressing together said sheets impregnated with said hydrophilic gel and heating said sheets while under pressure to harden said gel into a rigid, infusible cellular form which bonds said sheets together, and retains colloidally dispersed water droplets entrapped in the cells of the cellular mass whereby a laminated sheet material having the above specified characteristics is produced.

2. A process as defined in claim 1 in which the fibrous sheets are paper sheets and in which the residual water content in the hydrophilic sol is between about 3.5% and 7.5%.

3. A translucent, flexible laminated sheet material, which is sufficiently non-brittle to be stamped and punched without fracturing and is stable against changes in dimensions with varying moisture conditions, comprising a plurality of superimposed laminated fibrous sheets impregnated and bonded together by a phenol formaldehyde resin into a unitary, substantially homogeneous sheet, in accordance with the process of claim 1.

4. A process of producing flexible laminated sheet material, which is sufficiently non-brittle to be stamped and punched without fracturing and is stable against changes in dimension with varying moisture conditions, comprising impregnating a fibrous sheet with a hardenable phenol formaldehyde resin sol produced by reacting 1 mol of phenol with 1.5 to 3 mols of formaldehyde in the presence of an alkaline catalyst followed by neutralization of the excess alkali and dehydration of the reaction product to produce a hydrophilic sol containing an appreciable amount of water; heating the impregnated sheets, and without driving out all the water, converting said hydrophilic sol into a hydrophilic gel containing water colloidally dispersed throughout the mass, pressing together said sheets impregnated with the hydrophilic gel and heating said sheets while under pressure to harden said gel into a rigid, infusible form which bonds said sheets together and retains water as minute droplets colloidally dispersed throughout the mass to form a cellular structure, whereby a laminated sheet material having the above specified characteristics is produced.

WESLEY R. THOMPSON.
WILLIAM E. FLOOD.